United States Patent
Grim et al.

(10) Patent No.: US 9,216,369 B2
(45) Date of Patent: Dec. 22, 2015

(54) FILTER DEVICE

(75) Inventors: Gunnar Grim, Weichs (DE); Bruno Hegnauer, Gauting (DE)

(73) Assignee: ANDRITZ KMPT GmbH, Vierkirchen (DE)

(*) Notice: Subject to any disclaimer, the term of this patent is extended or adjusted under 35 U.S.C. 154(b) by 868 days.

(21) Appl. No.: 13/337,285

(22) Filed: Dec. 26, 2011

(65) Prior Publication Data
US 2012/0160748 A1 Jun. 28, 2012

(30) Foreign Application Priority Data

Dec. 27, 2010 (DE) .......................... 10 2010 061 561

(51) Int. Cl.
| | |
|---|---|
| *B01D 33/09* | (2006.01) |
| *B01D 33/00* | (2006.01) |
| *B01D 33/067* | (2006.01) |
| *B01D 33/74* | (2006.01) |
| *B01D 33/80* | (2006.01) |
| *B01D 33/82* | (2006.01) |

(52) U.S. Cl.
CPC ............ *B01D 33/09* (2013.01); *B01D 33/0016* (2013.01); *B01D 33/067* (2013.01); *B01D 33/745* (2013.01); *B01D 33/808* (2013.01); *B01D 33/82* (2013.01)

(58) Field of Classification Search
CPC B01D 33/0009–33/0038; B01D 33/06–33/13; B04B 7/16
See application file for complete search history.

(56) References Cited

U.S. PATENT DOCUMENTS

| | | | |
|---|---|---|---|
| 919,628 A | 4/1909 | Oliver | |
| 1,223,245 A | 4/1917 | Biesel | |
| 1,453,311 A * | 5/1923 | Engel, Sr. | 210/394 |
| 1,667,465 A * | 4/1928 | Wait | 210/768 |
| 2,092,111 A | 9/1937 | Dons et al. | |
| 2,148,903 A * | 2/1939 | Garnsey | 210/394 |

(Continued)

FOREIGN PATENT DOCUMENTS

| | | |
|---|---|---|
| DE | 10005796 A1 | 8/2001 |
| EP | 0033371 A1 | 8/1981 |

(Continued)

OTHER PUBLICATIONS

Deutsches Patent-und Markenamt, Office Action for German Application No. 10 2010 061 561.7, dated Sep. 16, 2011.

(Continued)

*Primary Examiner* — Heidi Kelley
*Assistant Examiner* — Eric McCullough
(74) *Attorney, Agent, or Firm* — Cahn & Samuels, LLP

(57) ABSTRACT

In at least one embodiment, a filter device for filtering out of solid substance from a solid-liquid-mixture where the filter device includes a bearing shaft; a rotation body attached to the bearing shaft and supported by the bearing shaft to be rotatable; a single filter cell formed on the rotation body with a filter structure attached to the rotation body for filtering out the solid substance and a connection channel formed in the rotation body that extends from a filter structure outlet side to an outlet opening formed adjacent to the bearing shaft and via which the connection channel is permanently connected with an intermediate connection channel formed in the bearing shaft; a liquid discharge line connected with or formed by the intermediate connection channel; a plurality of branch-off lines which are branched-off from the liquid discharge line; and a control device having a valve assembly.

19 Claims, 8 Drawing Sheets

(56) References Cited

U.S. PATENT DOCUMENTS

| | | | | |
|---|---|---|---|---|
| 2,362,300 | A | * | 11/1944 | Bernhard ............ 210/393 |
| 2,823,806 | A | | 2/1958 | Harlan |
| 3,061,477 | A | | 10/1962 | Lavallee |
| 3,096,280 | A | | 7/1963 | Davis et al. |
| 3,235,086 | A | | 2/1966 | Krynski |
| 3,306,460 | A | * | 2/1967 | Luthi ............ 210/404 |
| 3,630,380 | A | | 12/1971 | Barnebl et al. |
| 3,638,798 | A | | 2/1972 | Basfeld et al. |
| 4,442,001 | A | * | 4/1984 | Davis ............ 210/402 |
| 4,695,381 | A | * | 9/1987 | Ragnegard ............ 210/404 |
| 5,046,338 | A | | 9/1991 | Luthi |
| 5,055,205 | A | * | 10/1991 | White ............ 210/784 |
| 5,683,582 | A | | 11/1997 | Luthi |
| 6,488,849 | B2 | * | 12/2002 | Bertolotti et al. ......... 210/360.1 |
| 2005/0077254 | A1 | | 4/2005 | Sawhill et al. |
| 2005/0161391 | A1 | * | 7/2005 | Ettlinger ............ 210/396 |
| 2012/0160761 | A1 | | 6/2012 | Hegnauer et al. |

FOREIGN PATENT DOCUMENTS

| | | |
|---|---|---|
| GB | 2361879 A | 11/2001 |
| WO | WO09915255 A * | 4/1999 |

OTHER PUBLICATIONS

Espacenet, English abstract of DE 100 05 796 A1, Aug. 16, 2001.
Espacenet, English abstract EP0033371 (A1).

* cited by examiner

FILTER DEVICE

This patent application claims priority Germany patent application number DE 10 2010 061 561.7-27 filed on Dec. 27, 2010, which application is hereby incorporated by reference in its entirety.

I. FIELD OF THE INVENTION

The invention generally relates to a filter device, for example a filter device for use in the manufacture of pharmaceutical products.

II. BACKGROUND OF THE INVENTION

In the pharmaceutical industry the manufacturing process of medical products, including chemically based as well as biologically based medical products, often includes filtering out of the product, which is present in a suspension in form of solid substance.

Discontinuous/batch-wise filter processes are usually used, because of high standards regarding product quality as well as cleanness, the possibility for cleaning, and the possibility for inspection of the filter device(s), in the pharmaceutical industry. In this respect, however, there may be a disadvantage of a reduced productivity which results from a low ratio between productive phase to non-productive phase.

III. SUMMARY OF THE INVENTION

The invention in at least one embodiment provides a filter device, by which increased productivity can be achieved and which can comply with the high standards in the pharmaceutical industry regarding cleanness, the possibility for cleaning and the possibility for inspection of the filter device so that it is applicable for the manufacture of pharmaceutical products.

In at least one embodiment according to the invention, a filter device for filtering out a solid substance from a solid-liquid-mixture includes a bearing shaft that extends along a rotational axis; a rotation body attached to (in at least one embodiment detachably attached) the bearing shaft and is supported by the bearing shaft so as to be rotatable about the rotational axis; a single filter cell formed on the rotation body and has a filter structure which is attached to the rotation body, e.g. at the outer circumference of the rotation body, for filtering out the solid substance from the solid-liquid-mixture, allowing the liquid of the solid-liquid mixture to pass therethrough from a filter structure inlet side to a filter structure outlet side, and a connection channel which is formed in the rotation body and which extends from the filter structure outlet side to an outlet opening which is formed to be adjacent to the bearing shaft and via which the connection channel in at least one embodiment is permanently connected with an intermediate connection channel (in a fluidly sealed manner), which is formed in the bearing shaft, independent from the rotation position of the rotation body; a liquid discharge line which is ((in operation in at least one embodiment) permanently) connected with the intermediate connection channel and/or is coupled to the intermediate connection channel or is formed by the intermediate connection channel; a plurality of branch-off lines which are branched-off from the liquid discharge line; and a control device having a valve assembly, by which the branch-off lines are connectable with the liquid discharge line in a controlled manner, e.g. selectively, in dependence on the rotation position of the rotation body.

The valve assembly in at least one embodiment includes a plurality of valves, for example, a valve register or a valve island, which are arranged to be assigned to the branch-off lines and via which the branch-off lines are connectable with the liquid discharge line based on the rotation position of the rotation body in a controlled manner, e.g. selectively. A further example of the valve assembly is a multiple way valve such as a rotary valve.

In further embodiments, the valve assembly (e.g. the plurality of valves) is arranged directly on or in the liquid discharge line. In case of using a plurality of valves, these are, for example, arranged directly on or in the liquid discharge line. If the liquid discharge line is formed by the intermediate connection channel, formed in the bearing shaft, or is identical therewith, the valve assembly may, for example, be arranged directly on the bearing shaft or be a sealing disc co-rotatable with the bearing shaft (in as far as the bearing shaft is rotatably supported), in which a through opening is formed so as to be arranged and/or led out eccentrically with respect to the rotation axis, which is (permanently) in fluid connection with the intermediate connection channel, and a stationary control disc which is in fluidly sealed slide rotation engagement with the sealing disc and in which control openings are formed, which will be connected to the through opening in dependence on the rotation of the bearing shaft and, hence, of the sealing disc in a controlled manner (successively and repeatedly) and to which the branch-off lines are connected.

The control device in a further embodiment includes a pressure control device by which a pressure difference between the filter structure outlet side and the filter structure inlet side is controllable, e.g. can be varied, based on the rotation position of the rotation body from the filter structure outlet side. It should be understood based on this disclosure that in at least one embodiment—with regard to the pressure difference—by solid substance depositing on and/or adhering to the filter structure, the filter structure inlet side can be shifted and/or is shifted from a position directly at the outside of the filter structure to a position at the outside of the solid substance/filter cake adhering to the filter structure.

The intermediate connection channel in at least one embodiment extends in and/or along the rotation axis, wherein the bearing shaft is a hollow shaft with an axial central through channel. The longitudinal axis of the bearing shaft may be identical with the rotation axis. The outlet opening is in at least one embodiment formed co-axially with the rotation axis and is arranged to be adjoining to the inlet opening, formed in the frontal end of the bearing shaft, of the intermediate connection channel. That is, the outlet opening of the connection channel and the inlet opening of the intermediate connection channel are arranged to be axially aligned to each other with respect to the rotation axis.

The filter structure may be interchangeably or non-interchangeably attached to the rotation body. In case of interchangeability, the filter structure can be interchanged when interchanging the product/mixture to be filtered, wherein the rotation body may be cleaned, if necessary.

The simple structure of at least one of the above embodiments with a single filter cell and the single channel section connected thereto, with serially arranged connection channel, intermediate connection channel and liquid discharge line, can be easily kept clean (small dead space and, hence, small space for dirt accumulation) and can be easily inspected regarding cleanness. In case of non-interchangeability of the filter structure, the rotation body may be provided as a one-way-filter-rotation-body which can be interchanged as a whole when switching to another product/mixture to be filtered.

The filter cell in at least one embodiment includes a filter cloth/screen cloth, which (in the area of the filter cell) is attached, e.g. stretched, to the outer circumference of the rotation body, or it may also be a solid body screen, for example made of metal or a firm plastic. The filter structure may be supported by a perforated supported plate such as a metal or plastic plate. The filter structure may be interchangeably or non-interchangeably attached to the rotation body.

The rotation body may have any geometrical shape. For example, it may be formed in the shape of a cylindrical drum (e.g., a circular cylindrical drum) or in the shape of a (circular) cylindrical drum segment, wherein in case of a cylindrically shaped or cylindrical segment shaped formation of the rotation body, the (longitudinal) cylinder axis may, e.g., be arranged co-axially to the rotational axis. The rotation body may also be formed as a cuboid or as a prism or as torus, etc. The rotational axis extends substantially horizontally, wherein the rotational axis may also be provided to extend at an inclined angle of less than 90° to the horizontal.

The bearing shaft in at least one embodiment has a free end, wherein the rotation body is attached to the free end of the bearing shaft as well as is supported by a bearing only on one side. The rotation body may alternatively be supported on both sides, for example, wherein the bearing shaft may extend through the rotation body and may be received in a bearing on both sides of the rotation body, or wherein the rotation body may be attached to a free end of the bearing shaft and additionally supported on its (axial) side facing away from the bearing shaft by a support shaft which is separate from the bearing shaft. The support shaft which is separate from the bearing shaft is arranged co-axially to the rotation axis and may be supported/arranged on or in a removable housing lid of a housing, in which the rotation body is accommodated, and may be removable together with the housing lid.

The valve assembly (e.g. the valves/valve register thereof) of the control device in at least one embodiment is arranged directly on the liquid discharge line. Since by means of the valve assembly, the corresponding plurality of branch-off lines can be connected to the liquid discharge line based on the rotation position of the rotation body in a controlled manner, e.g. selectively, fluid (liquid or gas) discharged via the liquid discharge line can be individually branched-off in a controlled manner, e.g. selectively, to thereby, e.g., discharge different fluids/liquids individually (will be discussed further below in detail).

In at least one embodiment where the control device is a pressure control device, the liquid discharge line may, e.g., be provided, via the respective branch-off line, with an over pressure or under pressure respectively assigned to the respective branch-off line. However, in the branch-off lines and in the liquid discharge line there may also be permanently present the same (under) pressure, or in those branch-off lines, which serve discharging of fluid, the same (under) pressure may be present. The fluid discharged/present in the fluid discharge line may be different based on the rotation position of the rotation body. For example, the fluid may be the liquid separated from the mixture by means of the filter structure (that is, e.g., the filter cell is presently located in the mixture), and the fluid may, e.g., be a wet gas and/or wet air, which is sucked off through the connection channel when the filter dries, and the fluid may, e.g., be a washing fluid, by means of which the solid substance cake adhering to the rotation body is washed. These different fluids may be branched-off individually/in an assigned manner via the respective branch-off line from the fluid discharge line in dependence on the position of the rotation body in a controlled manner, and thereby discharged.

The valves in at least one further embodiment are arranged in the liquid discharge line in series or in parallel. The control device (e.g., if provided as pressure control device) may, in addition to valve assembly, include a pressure control valve, by means of which the pressure in the fluid discharge line can be varied in based the rotation position of the rotation body and thereby the pressure difference between the filter structure inlet side and the filter structure outlet side can be varied from the filter structure outlet side.

Because of the possibility of varying the pressure difference between the filter structure inlet side and the filter structure outlet side, which, for example, may be done by means of the valve assembly, with the one or the more valves, of the control device (e.g., if a respective different (under) pressure is provided in the branch-off lines), the pressure difference between the filter structure inlet side and the filter structure outlet side can be manipulated in dependence (or based) on the rotation position of the rotation body in any controlled manner to thereby be able to optimize the filter result, e.g., with regard to product quality required by the pharmaceutical industry. Varying from the filter structure outlet side allows to selectively apply an under pressure/over pressure to the filter cell. The single channel section constituted by connection channel, intermediate connection channel and liquid discharge line, and the single (single present) filter cell can be easily cleaned and inspected. The control device in a further embodiment varies the pressure at the filter structure inlet side. To this end, the rotation body may, e.g., be accommodated in a sealed housing (that is, in a sealed housing interior of the housing), the housing interior of which can be provided with over pressure and/or lower pressure by means of a pressure air pump and/or a suction pump. The possible use of the valve register additionally allows discharge of different fluids/liquids (e.g., liquid separated from the solid-liquid-mixture by the filtering process, washing liquid and/or wet gas/wet air created when the solid substance, adhering to the filter cell, dries) by different lines/branch-off lines branched-off from the liquid discharge line and respectively assigned to the valves. Via such a branch-off line a high over pressure may be applied to the filter structure outlet side of the filter cell to facilitate removal of solid substance from the rotation body when discharging the solid substance. By the continuous rotatability of and/or by continuously rotating the rotation body an increase of productivity is achievable. The possible one side and/or cantilever bearing of the rotation body in at least one embodiment reduces the size of the device and dead space for dirt accumulation, wherein the rotation body may also be dismountable. A central discharge of the liquid through the bearing shaft in at least one embodiment results in short discharge ways, whereby the space for dirt accumulation is further reduced.

The rotation body in a further embodiment is non-rotatably attached to the bearing shaft, that is, it may be co-rotatable with the bearing shaft. The bearing shaft thereby forms a rotary shaft. In this embodiment, there are no dirt-generating rotational bearing parts in the area of the rotation body. The rotation body may then be accommodated in the housing in a more dirt protected manner, and the bearing may be provided outside of the housing/housing interior accommodating the rotation body. However, the rotation body may also be rotatably supported on the rotation body. The bearing shaft and/or the rotary shaft is, e.g., provided as a hollow shaft and/or as hollow rotary shaft, wherein the interior space longitudinally extending through the hollow shaft/hollow rotary shaft may form and/or constitute the intermediate connection channel.

The rotation position of the rotation body in at least one embodiment is detected mechanically by means of a corotating cam disc which, for example, includes control cams which are mechanically (e.g. via plungers/rods) connected with the valves (e.g., the valves of the valve register) and, e.g., with any other device to be operated in dependence on the rotation position of the rotation body, such as a pressure regulator or a washing device (see below). The control device in other embodiments includes a sensor such as an optical sensor (e.g. an LED-sensor), a magnet sensor or a capacitive sensor) for detecting the rotation position of the rotation body and an electronic control unit connected to the sensor and to the valves, by which the valves are controllable based on the rotation position of the rotation body detected by the sensor for providing or interrupting the connection between the branch-off line, assigned to the respective valve, and the liquid discharge line. In case of using such a sensor a possible mechanical signal feedback connection between the valves and the position of the rotation body or also between another device, which is to be operated in dependence on the rotation position of the rotation body, and the position of the rotation body may be replaced by a corresponding configuration/programming of the electronic control unit. The electronic control unit may itself be varied in an easy way (via amending programming) and therefore may be easily adapted to diverse products/production requirements. The control device may, instead of or in addition to electronic control components, also use hydraulic or pneumatic control technique.

The intermediate connection channel may, e.g., be provided so as to extend in and/or along the rotation axis.

In at least one embodiment, the possible one-side bearing of the rotation body in connection with the possibility to dismount the rotation body from the bearing shaft allows easy access for cleaning and inspecting when a change of product is carried out.

In the respective branch-off line, e.g., an over pressure/under pressure assigned to the respective branch-off line may be present so that the connection channel, when the valve assembly (e.g. the respective valve) connects the respectively assigned (assigned to the respective rotation position of the rotation body) branch-off line with the liquid discharge line, will be provided with the over pressure/under pressure present, e.g. permanently present, in the branch-off line. Further, therewith the above-described additional functions (mixture-liquid discharge, pressure air supply, wet gas discharge, washing fluid discharge) may be applied to the respective branch-off line in dependence on the rotation position of the rotation body in a quick manner.

The filter device in at least one embodiment includes a sealed (fluidly sealed) housing (that is, a housing having a sealed housing interior) in which the rotation body is accommodated. The housing wall defines/limits the housing interior on the side of the bearing shaft and/or the bearing (which is arranged only on one side) and, hence, is a front end wall with regard to the definition of the housing interior accommodating the rotation body. The bearing may be arranged in a port section formed by or added to the said end wall of the housing.

The filter device according to any of the above-described embodiments in at least one embodiment further includes a sealed housing (in the afore-mentioned aspect including the sealed housing, the latter, e.g., has the following additional features), in which the rotation body is at least partially enclosed, wherein the housing includes a housing opening on an axial side facing away from the bearing shaft and covered by a housing lid and through which the rotation body can be removed from the housing in axial direction of the rotation axis.

In the filter device according to any of the above-described embodiments, the filter cell in at least one further embodiment includes a filter pocket on the side of the filter structure outlet side and formed in the rotation body, e.g. in the outer circumference of the rotation body, and tapering towards the corresponding connection channel.

In the filter device according to any of the above-described embodiments, the connection channel of the filter cell in at least one embodiment further includes a first channel portion extending perpendicularly to the rotation axis from the filter structure outlet side, and a second channel portion extending parallel to the rotation axis from the first channel portion to the outlet opening, or the connection channel of the respective filter cell may, e.g., extend from the filter structure outlet side to its outlet opening in an angle to both the rotation axis and to the perpendicular thereof.

In the filter device according to any of the above-described aspects/embodiments, the bearing shaft in at least one embodiment is a rotatably driven rotary shaft, with which the rotation body is non-rotatably connected. That is, the bearing shaft and the rotation body are commonly rotatably supported and rotate together around the rotation axis.

In the filter device according to any of the above-described aspects/embodiments, the rotation body in at least one embodiment is coupled to the end of the bearing shaft by means of a quick fastener plug-in coupling (e.g., a bayonet fastener or a snap-fit connection) or by means of a quick fastener screw connection (e.g., a diary coupling).

In at least one embodiment, the supply of liquid-solid-mixture to be filtered is provided, e.g., in a continuous manner via a mixture supply connection provided on the housing which accommodates the rotation body.

In the following the invention will be described in further detail on the basis of embodiments with reference to the drawings.

IV. BRIEF DESCRIPTION OF THE DRAWINGS

In the drawings, like reference characters generally refer to the same parts throughout the difference vies. The drawings are not necessarily to scale, emphasis instead generally being placed upon illustrating the principles of the invention. In the following description, various embodiments of the invention are described with reference to the following drawings. The use of cross-hatching and shading within the drawings is not intended as limiting the type of materials that may be used to manufacture the invention.

FIGS. 5B to 5J illustrate different alternative embodiments of a valve device of the control device of FIG. 5A.

V. DETAILED DESCRIPTION OF THE INVENTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
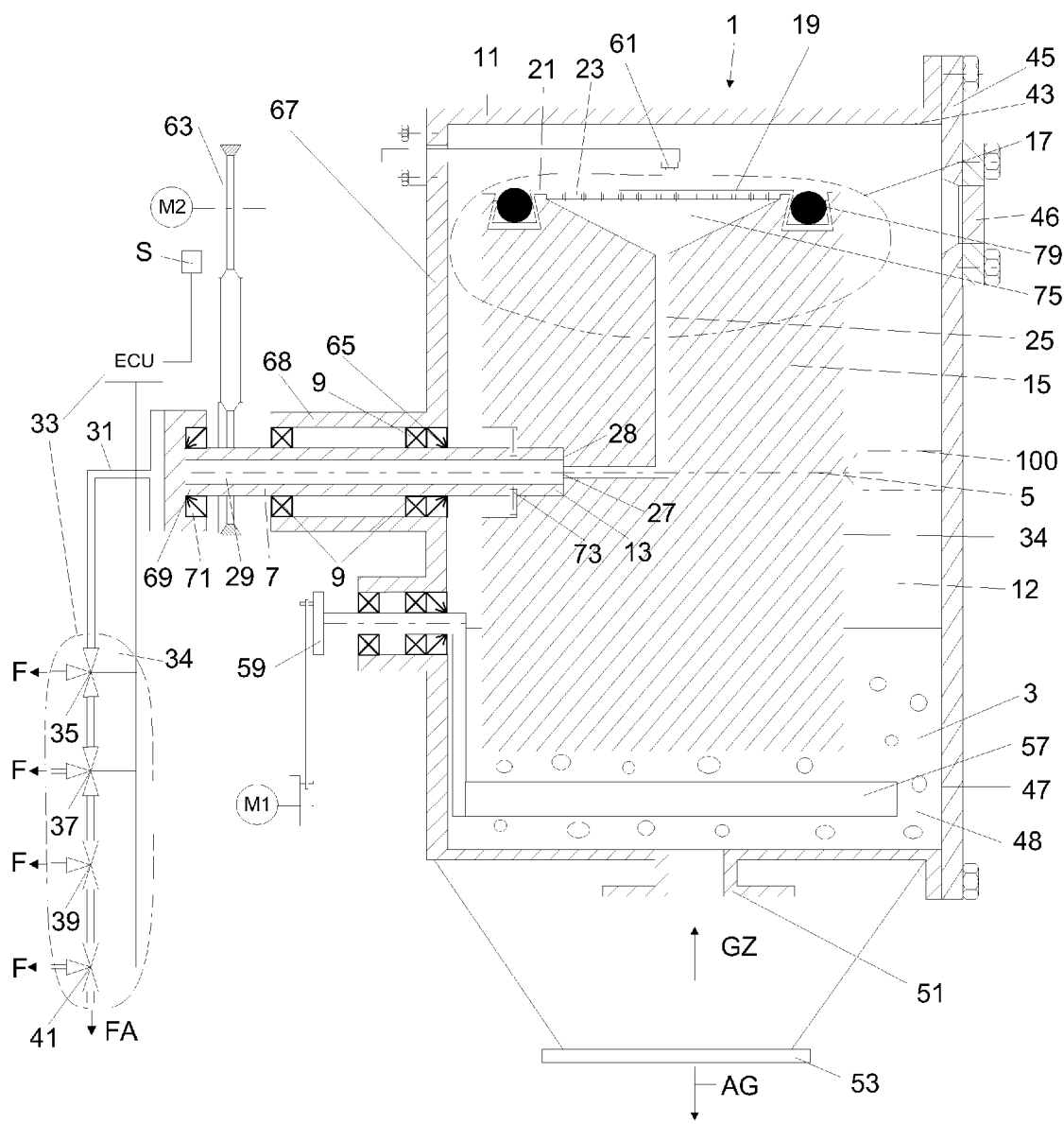
FIG. 1 illustrates a schematic sectional side view of a filter device according to an embodiment of the invention.
Figure 2:
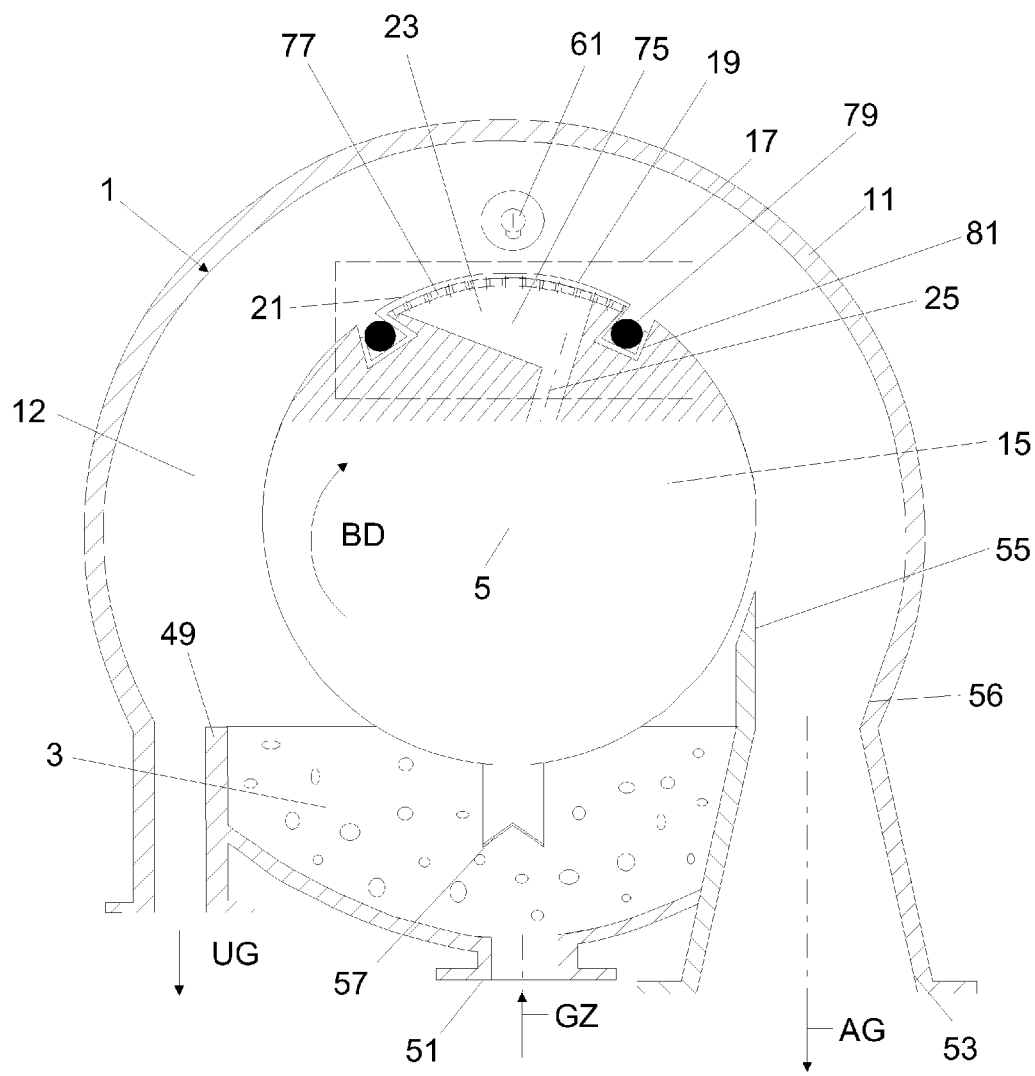
FIG. 2 illustrates a schematic sectional front view of the filter device of FIG. 1.

The filter device 1, as illustrated in FIGS. 1 and 2, for filtering out solid substance from a solid-liquid-mixture 3 according to a first example embodiment of the invention includes a bearing shaft 7 extending along a rotation axis 5 and in at least one embodiment is a hollow rotary shaft, which is rotatably supported in a housing 11 by a roller bearing 9 (a slide bearing may also be used) and having a free end 13 and a rotation body 15 detachably and non-rotatably attached to the free end 13 of the bearing shaft 7 and, hence, co-rotatable with the bearing shaft 7 about the rotation axis 5 as well as only supported on one side (cantilever) (that is, the bearing shaft 7, seen along the rotation axis 5, is supported and/or mounted in the housing 11 only on one axial side of the rotation body 15). A single (or sole) filter cell 17 formed (or is present) on the rotation body 15 and includes a filter structure 19 (for example in form of a filter cloth) attached to the outer circumference of the rotation body 15 for filtering out the solid substance from the solid-liquid-mixture 3, allowing the liquid of the solid-liquid mixture 3 to pass therethrough from a filter structure inlet side 21 to a filter structure outlet side 23. A connection channel 25 is formed in the rotation body 15 and extends from the filter structure outlet side 23 and leading out to an outlet opening 27 which is arranged in the rotation axis 5 and which is provided so as to be adjoining to a front face of the bearing shaft 7. In this embodiment, the outlet opening 27 adjoins the front end 28, provided on the free end 13 of the bearing shaft, of the bearing shaft 7 (wherein a fluidly sealed connection is formed between the connection channel 25 and the intermediate connection channel 29) and is aligned to the rotation axis 5 and, hence, to the longitudinal hollow space formed in the bearing shaft 7. In this illustrated embodiment, the connection channel 25 is permanently connected to an intermediate connection channel 29, which is formed in the bearing shaft 7 (and which is formed by the longitudinal hollow space of the bearing shaft 7 provided as a hollow shaft). Independent from the rotation position of the rotation body 15, a liquid discharge line 31, which is connected to (or in fluid communication with) the intermediate connection channel 29, attached to a plurality of branch-off lines F, each of which being branched-off (in this embodiment, successively branched-off) from the liquid discharge line 31 to extend therefrom. A control device 33 having a valve assembly 34 which, in this embodiment, includes a plurality of valves 35, 37, 38, 41 and which, with its valves 35, 37, 38, 41, is (directly) arranged at the liquid discharge line 31 and connected between the liquid discharge line 31 and the branch-off lines F and via which the branch-off lines F can be connected and/or will be connected with the liquid discharge line 31 in dependence on the rotation position of the rotation body in a controlled manner, e.g. selectively.

Figure 5A:
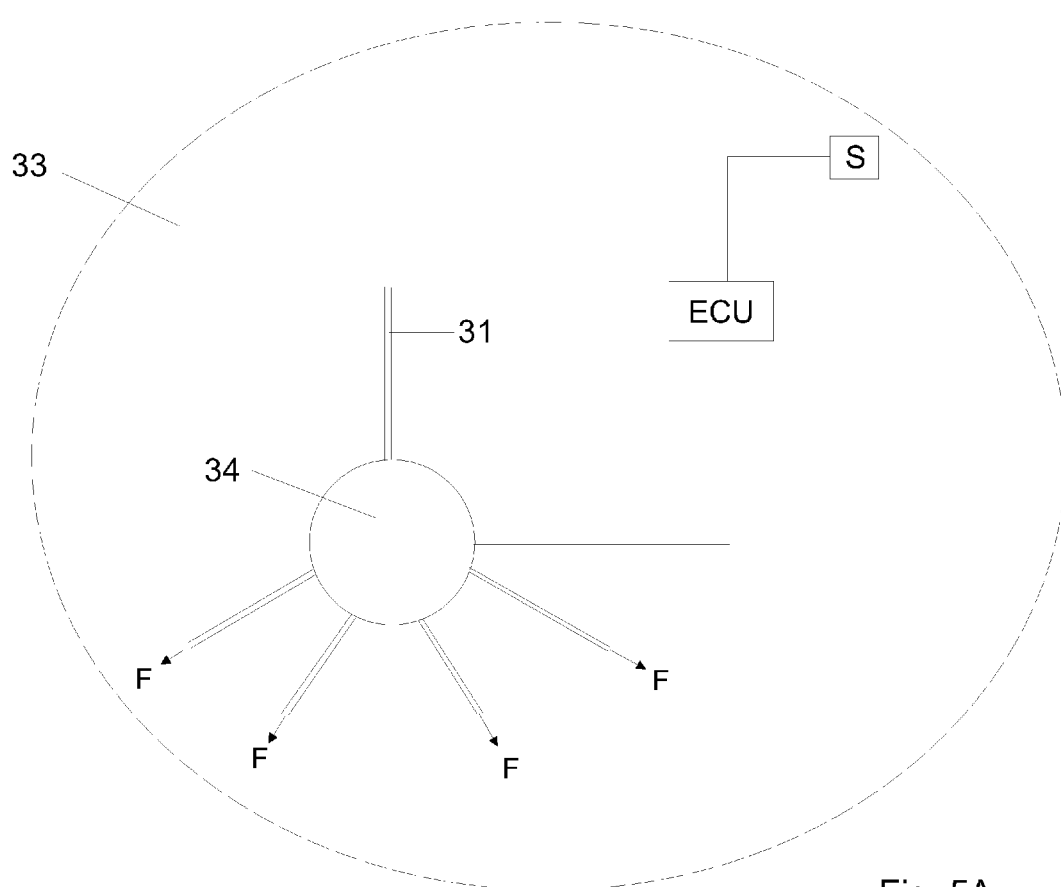
FIG. 5A illustrates a schematic view of a control device of the filter device according to another embodiment of the invention.

FIG. 5A schematically shows the valve assembly 34 in a more general manner. Further variations of the valve assembly 34 will be described further below with reference to, e.g., FIGS. 5B-5J.

In at least one embodiment, the control device 33 may, e.g., be formed as a pressure control device or include a pressure control device, by which the pressure difference between the filter structure outlet side 23 and the filter structure inlet side 21 can be varied in dependence on the rotation position of the rotation body 15 from the filter structure outlet 23.

The rotation body 15 in at least one embodiment has a cylinder-drum shape, e.g. circular-cylinder-drum shape, wherein the cylinder axis is arranged to extend co-axially to the rotation axis 5.

The plurality of valves 35, 37, 39, 41 of the valve assembly 34, in this embodiment, forms a valve assembly or a valve island. The valves 35, 37, 39, 41 are arranged in the liquid discharge line 31 in series, wherein the valves 35, 37, 39, 41 may also be arranged in the liquid discharge line 31 in parallel (see, e.g., FIGS. 5B and 5D), and wherein a combination of serially connected valves and of valves connected in parallel may be provided.

A branch-off line F respectively assigned to the respective valve 35, 37, 39, 41 is branched-off via the respective valve 35, 37, 39, 41, wherein the branch-off lines F are thus fluidly connectable to the liquid discharge line 31 in a controlled manner, e.g., selectively, via the valves 35, 37, 39, 41. Thereby, the liquid discharge line 31 (and via the liquid discharge line 31 the filter structure outlet side 23) can be provided with different pressures/under pressures (which, e.g., are permanently present in the respective branch-off line F with a pre-determined magnitude) via the diverse branch-off lines F, e.g. also in a controlled manner, e.g. selectively, to thereby provide a pressure difference between the filter structure inlet side 21 and the filter structure outlet side 23 in selectively controlled manner.

The control device 33 further includes a rotation position sensor S which generates an electrical rotation position signal and by which the rotation position of the rotation body 15 can be detected and/or is detected, and an electronic control unit ECU which is (electrically) connected to the rotation position sensor and the valves 35, 37, 39, 41 in order to control the valves 35, 37, 39, 41 in dependence on the rotation position signals received from the rotation position sensor (and, hence, in dependence on the rotation position of the rotation body 15) for providing or disconnecting the connection of the corresponding branch-off line F to the liquid discharge line 31 in dependence on the rotation position of the rotation body 15.

In the respective branch-off line F there is, e.g., permanently present a pre-determined (e.g. with respect to the filter structure inlet side 21) under pressure or over pressure so that when providing a connection between the respective branch-off line F and the liquid discharge line 31 the corresponding over pressure or under pressure is/will be applied to the filter structure outlet side 23 in a relatively quick manner.

In addition to the above-described valve assembly 34, which has a plurality of valves 35, 37, 39, 41 (valve register), the control device 33 in another embodiment may also include a pressure control device (e.g., a pressure control valve) for continuously or discretely adjusting the pressure/under pressure (in dependence on the rotation position of the rotation body) in the liquid discharge line 31.

The control device 33 in a further embodiment also includes a housing interior pressure control device, by means of which the housing interior 12, which accommodates the rotation body 15, of the housing 11 can be provided with over pressure and/or under pressure in a controlled manner to thereby adjust the pressure difference between the filter structure inlet side 21 and the filter structure outlet side 23 also from the filter structure inlet side 21.

The housing 11 accommodates the rotation body 15 completely (that is, the rotation body is completely enclosed by the housing and, hence accommodated in the housing interior 12 thereof, for example, accommodated in a sealed and/or fluidly sealed manner) and, e.g., has a cylinder drum shape conform to the outer circumferential movement path of the rotation body 15. The housing 11 includes an opening 43 when seen in direction of the rotation axis 5 is located on the axial side (facing away from the bearing shaft 7 and/or the bearing 9) of the rotation body 15 and a dismountable housing lid 45 closing (or covering) the opening 43 in a (fluidly) sealed manner. The opening 43, with its opening surface, extends substantially perpendicular to the rotation axis 5, wherein it is, e.g., provided to be co-axial to the rotation axis 5. The opening 43 is arranged to be aligned to the rotation body 15 in direction of the rotation axis 5 and has such a width that the rotation body 15 can be axially removed from the housing 11 through the opening 43 in direction of and/or along the rotation axis 5 when the housing lid 45 is removed. Further, a viewing/inspecting window 46 is provided in the housing lid 45, which may be provided with an optical view enlarging lens.

The lower housing portion 47 of the housing 11 forms and/or constitutes a pan for accommodating the sold-liquid-mixture 3. The level/gauge of the solid-liquid-mixture 3 is limited to a maximum by a level drain/level drain port. Excess mixture 3 is discharged in the direction of arrow UG and in at least one embodiment will be returned to the lower housing portion 47 through a mixture supply connection 51 by means of a pump circuit (not shown) (for example, in a continuous manner). The level drain may be provided with an interchangeable adapter piece (e.g., with an adapter tube piece), wherein adapter pieces of different tube length can be selectively applied to adjust the fill level in accordance with the length of the adapter tube piece. The level of the mixture 3 will be adjusted in any case such that the outer circumferential movement path of the rotation body 15 runs through the mixture 3 in order to thereby be able to move or in order to move the filter cell 17, in connection with the rotation of the rotation body 15, through the solid-liquid-mixture 15 in time intervals defined by the rotation speed and the outer circumference, and, hence, in a quasi-continuous manner.

The mixture (or suspension) supply connection 51 is proximate to the lower housing portion 47 (e.g. in form of a connection tube or connection flange), via which a solid-liquid-mixture to be filtered can be continuously supplied and/or is continuously supplied to the housing 11 (arrow GZ (mixture supply)). In the present embodiment, the suspension supply connection 51 extends from an outer circumference radially and diametrically inwardly towards the rotation axis 5.

Further, a solid discharge opening 53 is formed at the outer circumference of the housing 11, which faces in a direction tangential to the outer circumferential movement path of the rotation body 15 and through which solid substance filtered out from the solid-liquid mixture 3 can be discharged and/or outputted (arrow AG (solid discharge)) from the filter device 1. A scraper 55 is arranged on the housing 11 upstream of the discharge opening 53, which, e.g. by means of a scraping edge, is arranged in a small distance to the outer circumference and/or outer circumferential movement path of the rotation body 15 in order to scrape away and/or strike off the solid substance, which adheres to the rotation body 15 and/or to the outer circumference thereof, from the rotation body 15, so that the solid substance falls into a discharge hopper (or discharge channel) 56 upstream of the discharge opening 53 in the housing 11.

The filter device 1 is further provided with a mixture or suspension agitation device having a reciprocally moveable agitating arm 57 which in this embodiment is driven by a crank drive mechanism 59 driven by an electrical motor M1.

The filter device 1 further comprises a washing device having one or more washing nozzles 61 which are arranged adjacent to the outer circumferential movement path of the rotation body 15 and which are controllable in order to be able to spray, in a controlled manner, e.g. selectively, washing liquid onto the solid substance (solid substance filter cake) adhering to the outer circumference of the rotation body 15. The washing nozzle(s) 61 is connected to an electronic control unit (not shown) which controls/operates the washing nozzle(s) 61 based on the rotation position of the rotation body 15, which has been detected by the rotation position sensor. In order to prevent the washing liquid from getting into the mixture 3, collecting pans (not shown) may be arranged adjacent to the washing nozzle(s) 61 and adjacent to the outer circumferential movement path of the rotation body 15, by means of which washing liquid which does not reach the solid substance (filter cake) adhering to the outside of the filter structure 19 or which is repelled therefrom can be caught and can be discharged by corresponding lines.

The bearing shaft 7 provided as rotary shaft is rotatably driven by means of a transmission 63 (in this case in form of a belt transmission) driven by an electrical motor M2. Instead of the belt drive, any other type of transmission, such as, for example, a gear pinion transmission, a chain transmission, a friction gear transmission etc., may be used. The bearing shaft 7 is sealed against the housing wall 67 by means of a shaft sealing 65 (e.g. a rotary shaft seal), which housing wall 67 axially defines/limits the housing interior 12 on the side of the bearing shaft 7 and/or the bearing 9. The bearing 9 in at least one embodiment includes two bearing journals spaced in a distance from each other along the rotation axis 5, and the bearing 9 is arranged in a housing port 68 which extends from the housing wall 67 and away from the rotation body 15, which housing port 68 is provided in one-piece with the housing wall 67, wherein the housing port 68 may also be formed separately from the housing 11. In at least one embodiment, the housing pot 68 is a member extending out from the side of the housing 11 and includes a cylindrical passageway through which the bearing shaft 7 passes. In a further embodiment, the housing pot 68 is a cylindrical (or barrel) member extending from the side of the housing 11. Further, the bearing shaft 7 which, with its interior, defines the intermediate connection channel 29 is sealed against the housing 11 at its other longitudinal end 69 by means of a rotary shaft seal 71. Also at this other longitudinal end 69, the liquid discharge line 31 is connected to the bearing shaft 7 and/or to the intermediate connection channel 29 provided therein.

The rotation body 15 is, for example, mounted on the bearing shaft 7 to be dismountable therefrom, wherein the coupling between the rotation body 15 and the bearing shaft 7 is provided at the free end 13 facing the housing opening 43, e.g., by means of a quick fastener coupling 73 such as, for example, a bayonet fastener, a diary coupling, a snap fit connection, etc.

The single (or sole) filter cell 17 provided on the rotation body 15 includes a filter pocket 75 on the filter structure outlet side 23, which is formed in the outer circumference of the rotation body 15 and which is provided with a increasing radial pocket depth in an operational rotation direction (arrow BD) of the rotation body 15 in the circumferential direction thereof, wherein the connection channel 25 leaves from the filter pocket 75 at the deepest pocket location of the filter pocket 75. In a cross section parallel to the rotation axis 5 the filter pocket 75 has a funnel shape tapering towards the connection channel 25. A perforated support plate 77 (filter structure support) is arranged on the filter pocket 75, which covers a radial opening of the filter pocket 75 and along the radial outer side of which the filter structure 19 extends. In this embodiment, the filter structure 19 is an interchangeable flexible screen, e.g., a screen cloth, which extends over the filter pocket 75 and is held on the rotation body 15 by means of a fixing cord 79, for example, an elastic fixing cord 79 which extends around the filter pocket 75 and/or around the inlet opening thereof or an O-ring. The fixing cord 79 engages into a recess/groove 81 which is formed in the outer circumference of the rotation body 15 and which extends around the filter pocket 75. The filter cell 17 extends at the outer circumference of the rotation body 15, seen in the direction of the rotation axis 5, substantially over the major part of the width/height of the rotation body 15 or of the cylinder shape of the rotation body 15.

In at least one embodiment, the operation of the filter device 1 is, e.g., as follows. The cylinder drum shaped rotation body 15 is co-rotated with the rotatably driven bearing shaft 7 in operation direction (arrow BD), whereby the filter cell 1 runs through the solid-liquid-mixture 3, which is accommodated in the lower housing portion 47, in regular (or in case of changing rotational speed in corresponding irregular) time intervals and, hence, quasi-continuously, wherein the solid-liquid mixture 3 is, e.g., continuously, supplied with solid-liquid mixture 3 via the suspension/mixture supply connection 51.

In an operation condition, in which the filter cell 17 is submerged into the mixture 3, e.g. the valves 35, 37, 39, 41 are closed so that the branch-off lines F connected thereto are not connected to the liquid discharge line 31. A strong under pressure may be provided in the liquid discharge line 31, for example, by means of a liquid suction line (arrow FA) connected thereto, by means of which the liquid from the mixture 3 is sucked in through the filter cell 17 and is discharged via a liquid suction line (arrow FA) and/or via the liquid discharge line 31. Thereby, the solid substance keeps adhering to the filter structure 19, wherein the filter function is adjustable by adjusting the under pressure on the filter structure outlet side 23 (e.g. by operation of the valves 35, 37, 39, 41 and/or by control of the suction pump) from the filter structure inlet side 21.

When the filter cell 17 leaves the mixture 3, e.g. one or more under pressures can be applied to the filter structure outlet side 23 by means of the valve 41 and/or any one of the other valves 35, 37, 39 in a controlled manner, e.g. selectively, (wherein the liquid suction line FA may be disconnected from the liquid discharge line) to, e.g., carry out dehumidification, wherein the sucked wet gas then may, e.g., also be sucked off via an assigned branch-off line F which is different from the liquid suction line FA. The correct control/operation of the valves 35, 37, 39, 41 is carried out by the control device 33 in dependence on the rotation position of the rotation body 15 as detected by the rotation position sensor S.

When the filter cell 17 reaches the washing nozzle 61 then the valves 35, 37, 39, 41 will, e.g., be operated such that the washing fluid permeating the filter cake will be sucked off via again another branch-off line F.

Finally, a branch-off line F of the valves, for example, the valve 35, may also be permanently provided with a strong over pressure. This over pressure branch-off line F switchable via the valve 35 may, e.g., then be connected to the liquid discharge line 31, when the filter cell 17 is nearly arrived in front of the scraper 55 in order to then, e.g., apply a short over pressure impulse to the liquid discharge line 31 and, hence, to the filter structure outlet side 23 to thereby blast off the solid substance cake adhering to the outer side of the filter structure 19.

Thus, by means of the valve register, having one or more valves, of the control device 33, fluid may be discharged from the connection channel 25 in dependence on the rotation position of the rotation body 15 in any controlled manner and, for example, the pressure difference between the filter structure inlet side 21 and filter structure outlet side 23 can be manipulated from the filter structure outlet side 23 to thereby optimize the filtering result, e.g. with regard to a product quality required by the pharmaceutical industry. By continuous rotation of the rotation body, an increased productivity is achieved. The possible one-side and/or cantilever bearing of the rotation body may reduce the size of the device and the dead space for dirt accumulation. Further, the rotation body is easily accessible for cleaning purposes and, if necessary, is dismountable. The central discharge of the liquid through the bearing shaft results in short discharge ways, whereby the space for dirt accumulation is further reduced.

Figure 3A:
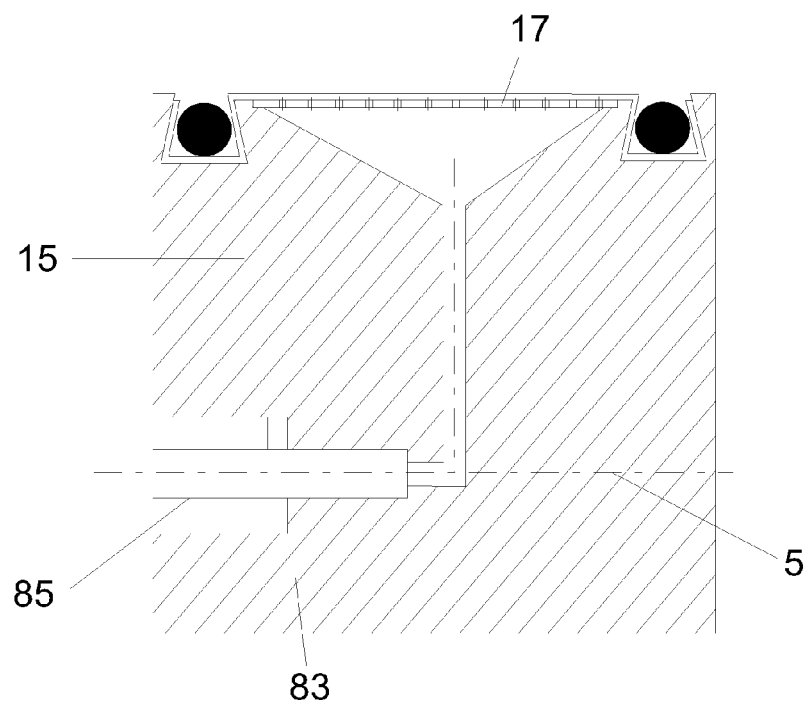
FIGS. 3a and 3b illustrate schematic partially sectional views of a rotation body according to a further embodiment of the invention.
Figure 3B:
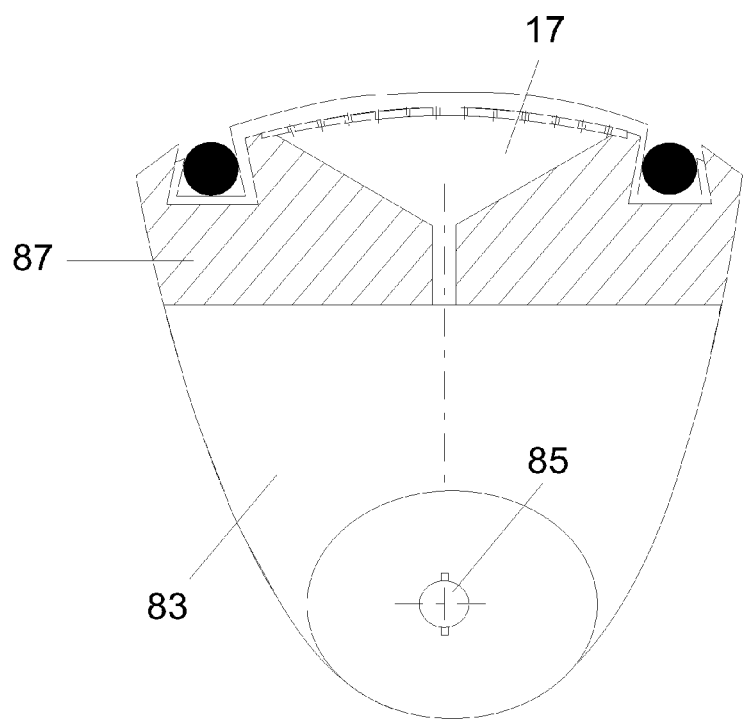

In FIGS. 3*a* and 3*b* a rotation body 15 is shown according to an alternative embodiment to the drum shaped rotation body of FIGS. 1 and 2. That is, the rotation body 15 of FIGS. 3*a* and 3*b* may, for example, be correspondingly used in the filter device of FIGS. 1 and 2.

The rotation body 15 of FIGS. 3*a* and 3*b* is also a single filter cell rotation body having one single filter cell 17 which is present on the outer circumference of the rotation body 15 and which, regarding its structure, corresponds to the filter cell 17 of the rotation body 15 of FIGS. 1 and 2.

In contrast to the rotation body 15 of FIGS. 1 and 2, the rotation body 15 according to the embodiment of FIGS. 3*a* and 3*b* is, however, not a cylinder-shaped drum body, but is a cylinder-segment-shaped body and, hence, is a body which is elongated radially with respect to the rotation axis 5, wherein the connection 85 for connection to the bearing shaft 7 is provided at a longitudinal end portion 83 of the rotation body, and wherein the filter cell 17 is provided at the other longitudinal end portion 87.

Figure 4:
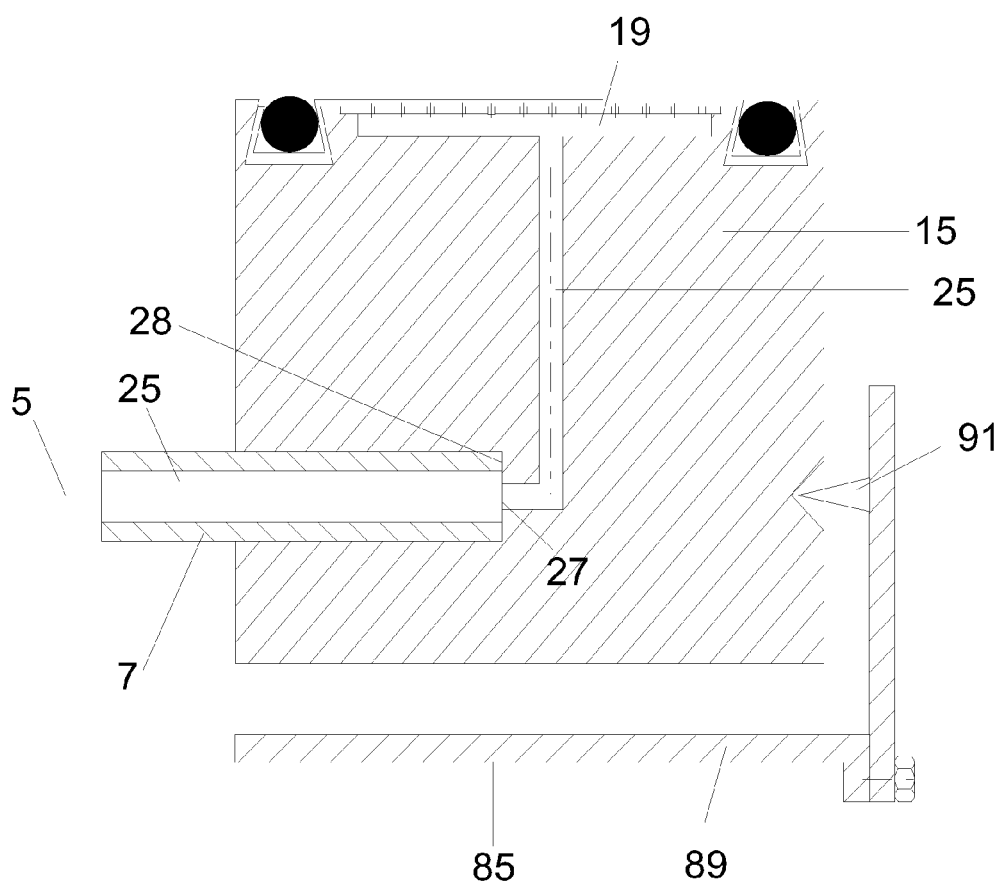
FIG. 4 illustrates a schematic sectional view of a connection between a rotation body and a bearing shaft according to still another embodiment of the invention.

FIG. 4 illustrates a further embodiment of a connection 85 between the rotation body 15 and a bearing shaft 7. The rotation body may be provided correspondingly to the rotation body 15 of FIGS. 1 and 2 as cylinder-shaped rotation body 15 or correspondingly to the rotation body of FIGS. 3*a* and 3*b* in a cylinder segment shape, wherein the rotation body 15 according to FIG. 4 is again a single filter cell rotation body having only one filter cell 17. In contrast to the rotation bodies 15 of FIGS. 1, 2, 3*a* and 3*b*, in which the bearing shaft 7, seen along the rotation axis 5, does not axially extend beyond the rotation body 15, the bearing shaft 7 according to the aspect of FIG. 4 comprises a shaft portion 89 (e.g. in form of a bow) which axially extends through or around the rotation body 15 and which extends to the axial side, facing away from the bearing shaft rotation bearing 9 (cf. FIG. 1), of the rotation body 15.

A support mandrel (or support pin) 91 is arranged on the shaft portion 89, which extends towards the rotation body 15 and which extends co-axially to the rotation axis 5 and which clamps the rotation body 15 between itself and a free front end 28 of the bearing shaft 7, thereby providing a (fluidly) sealed connection between the intermediate connection channel 29 within the bearing shaft 7 and the connection channel 25 within the rotation body 15, by planar pressing the free front end 28 of the bearing shaft and the outlet opening 27 (and/or an axial end surface, facing the bearing shaft 7, of a radial limitation wall of the outlet opening 27) of the connection channel 25 against each other. The rotation body 15 of FIG. 4, in spite of its two-side mounting, is, however, only supported by the bearing 9 on one side in the housing 11 and, hence, is one-side supported.

In many of the above example embodiments, the rotation body 15 has been described as a one-side supported rotation body 15. In FIG. 1, there is shown a variation in dash-point-line, according to which the rotation body 15 is additionally supported rotatably by an auxiliary bearing (or support bearing) 100 on its axial side facing away from the bearing 9 (with respect to the rotation axis 5). In this alternative embodiment, the auxiliary bearing 100 is attached to the housing lid 45 such that it will automatically be dismounted from the rotation body 15 when dismounting (or removing) the housing lid 45.

FIG. 5A generally shows a possible control device 33 as useable in the above-described embodiments of the filter device 1 and which includes a valve assembly 34 which is directly and/or proximately connected to the liquid discharge line 31, a control device ECU and a sensor S and/or detector detecting the rotation position of the rotation body, wherein the valve assembly 34, the control device ECU and the sensor are electrically connected with each other. The branch-off lines F are branched-off from the liquid discharge line 31 via the valve assembly 34 in order to—as described above— allow the individual discharge of fluid, present in the liquid discharge line based on the rotation position of the rotation body.

Figure 5B:
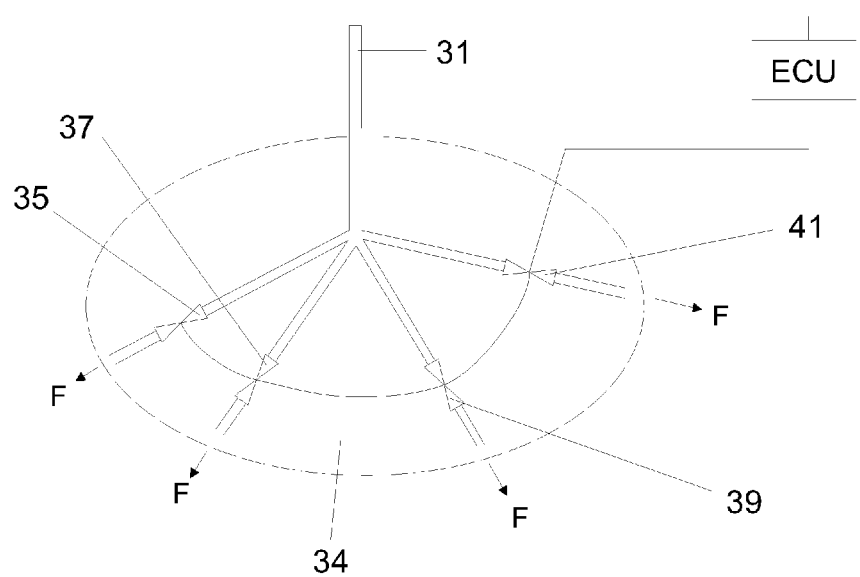

In the further embodiment illustrated in FIG. 5B, the valve assembly 34 has line departures leave in parallel from the liquid discharge line 31 from a same location, in each of which a valve 35, 37, 39, 41 is arranged, which are connected to the electronic control device ECU. The function of these valves 35, 37, 39, 41 may otherwise be such as that function as described in connection with the embodiment of FIG. 1.

Figure 5C:
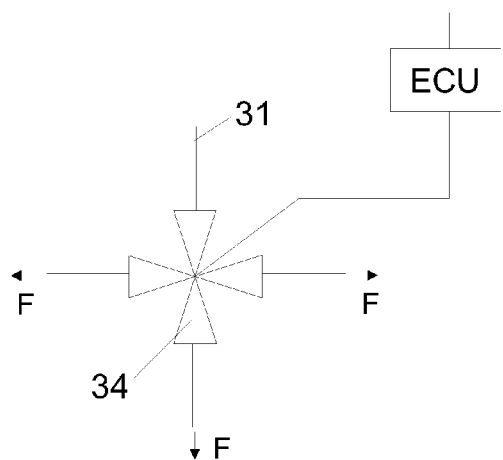

In the further embodiment illustrated in FIG. 5C, the valve assembly 34 includes a multi-way valve (here in form of a three-way valve), which is directly mounted in the liquid discharge line 31 and/or connected thereto and via which a plurality (here three, although other number of valves may be used) branch-off lines F are branched-off from the liquid discharge line 31, wherein the branch-off lines F are fluidly connectable and/or will be fluidly connected to the liquid discharge line 31 based on the rotation position of the rotation body 15 in a controlled manner.

Figure 5D:
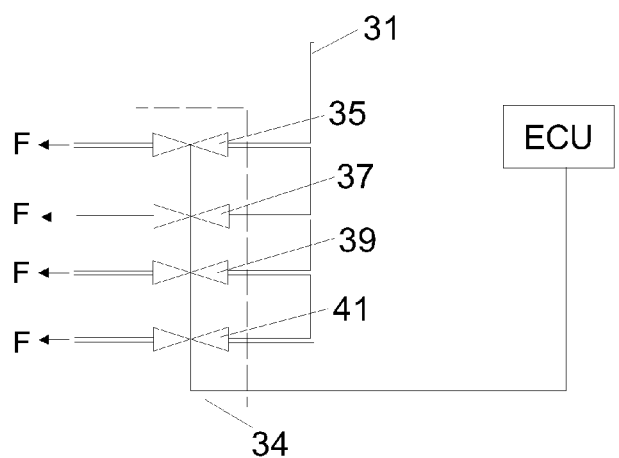

In the further embodiment illustrated in FIG. 5D, the valve assembly 34 includes branch-off departures in parallel on the liquid discharge line 31, in each of which there is provided a valve 35, 37, 38, 41 which is connected to the control device ECU. In contrast to the variation as shown in FIG. 5B, the branch-off departures are not branched-off from the same spot of the liquid discharge line 31, but from positions/spots arranged successively along the liquid discharge line 31. The function of the valve assembly 34 may again be as discussed above.

Figure 5E:
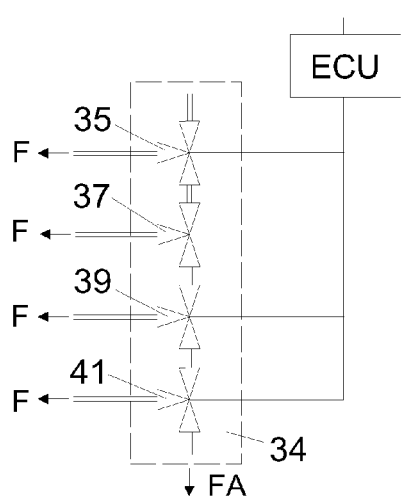

The embodiment illustrated in FIG. 5E, the valve assembly 34 corresponds to the variation according to FIG. 1 so that it is referred to the corresponding above description thereof.

FIGS. 5F to 5J show still further embodiments of the valve assembly 34 and/or of the control device 33, in which the controlled, e.g. selective, connection of the branch-off lines F based on the rotation position of the rotation body is not achieved via electronic control but via mechanical control. In the embodiments of FIGS. 5F to 5J, the liquid discharge line 31 is formed by the intermediate connection channel 29, that is, the liquid discharge line 31 and the intermediate connection channel 29 are lines and/or channels identical with each other. In these embodiments, the valve assembly 34 of the control device 33 is provided as a mechanical structural control unit and includes a sealing disc 150 which is co-rotatable with the bearing shaft 7 (which is rotatably supported) and in which a through opening 152 is formed, which is arranged and/or leads out eccentrically with respect to the rotation axis 5 and which is (permanently) in fluid connection with the intermediate connection channel 29. The structural control unit further includes a stationary control disc 154, which is in a fluidly sealed slide rotational engagement with the sealing disc 150 and in which control openings 156 are formed, which will be connected with the through opening 152 (and/or with the outlet opening thereof which is eccentrically arranged with respect to the rotation axis 5) based on the rotation of bearing shaft 7 (and, hence, of the rotation body) and, hence, of the sealing disc 150 in a controlled manner (successively and repeatedly) and to which the branch-off lines F are connected, whereby the control openings 156 and the branch-off lines F connected thereto will be individually connected to the intermediate connection channel 29 based on the rotation position of the rotation body in a controlled manner (successively and repeatedly).

The control openings 156 together with the through opening 152, which leads out eccentrically, act as a multi-way valve, the function of which (in mechanical form) is the same as that of the valves 35, 37, 39, 41 or of the multi-way valve of the above described valve assembly 34 which has been described to be controlled by the electronic control device ECU.

In the embodiment illustrated in FIGS. 5F1 and 5F2 (FIG. 5F2 shows a section along line A-A in FIG. 5F1) of the mechanically controlled valve device 34, the sealing disc 150 is a circumferential projection projecting radially outwardly, which is formed at the other longitudinal end 69, facing away from the rotation body, of the bearing shaft 7. The through opening 152 leads out radially outwardly at the outer circumference of the circumferential projection. The control disc 154 is a ring which completely encompasses the circumferential projection of the sealing disc 150 and in the inner wall of which the controlled openings 156 are formed. A respective one of the branch-off line F is in fluid connection with the respective control opening 156.

Figure 5G:
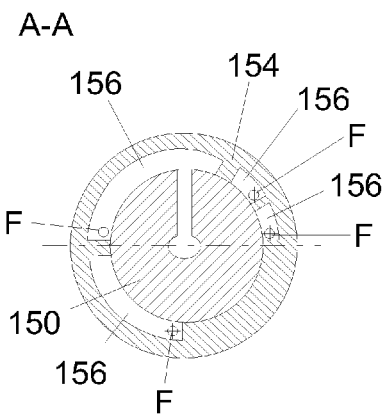
Figure 5G:
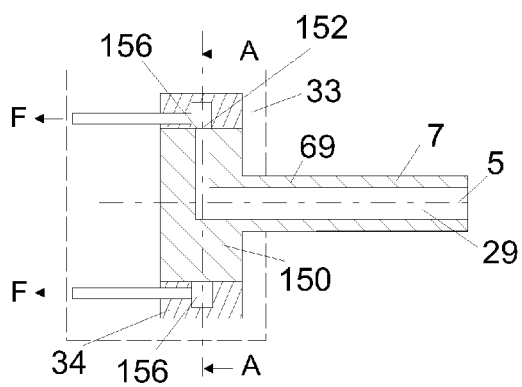
Figure 5G:
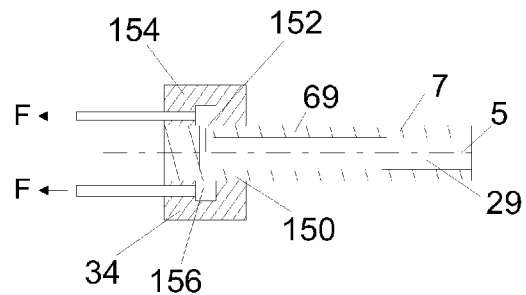

The embodiment illustrated in FIG. 5G of the valve assembly 34 substantially corresponds to that variation which is shown in FIGS. 5F1 and 5F2, wherein the sealing disc 150, however, is not provided as a circumferential projection, but is integrally formed by the end portion provided at the other longitudinal end 69 of the circular cylindrical bearing shaft 7.

Figure 5H:
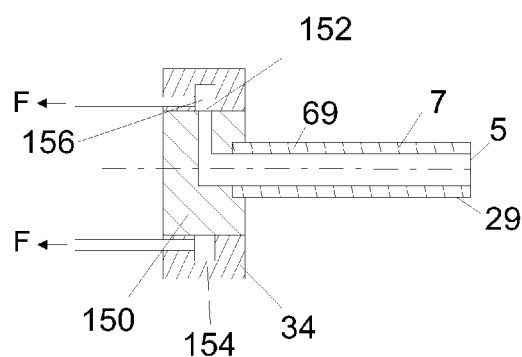

The embodiment illustrated in FIG. 5H, the valve assembly 34 also substantially corresponds to that variation shown in FIGS. 5F1 and 5F2, wherein the sealing disc 150, provided as circumferential projection, is however not materially formed with the bearing shaft 7 in one piece (as it is, e.g., the embodiment illustrated in FIGS. 5F1 and 5F2), but is an element separate from the bearing shaft 7, which is non-rotatably and, e.g., detachably arranged on the bearing shaft 7 (at the other longitudinal end 69 thereof).

The embodiment illustrated in FIGS. 5I1 and 5I2, the valve assembly 34 (FIG. 5I2 shows a section along line B-B in FIG. 5I1) substantially corresponds to that variation as shown in FIGS. 5F1 and 5F2, wherein, however, the control disc 154 is not in a radial (circumferential) fluidly sealed slide rotational engagement with the sealing disc 150, but is in an axial (with respect to the rotation axis 5) fluidly sealed slide rotational contact and/or slide rotation contact. Thus, the through opening 152 of the sealing disc 150 does not lead out at the outer circumference of the sealing disc, but leads out at the axial side, facing away from the bearing shaft 7, of the sealing disc 150. Correspondingly, the control openings 156 of the control disc 154 are formed on the axial side, facing the bearing shaft 7, of the control disc 154 in a manner so as to face the sealing disc 150. Further, the sealing disc 150 is located as a kind of cap on the front end side of the other longitudinal end 69 of the bearing shaft, and the through opening 152 extends from the intermediate connection channel 29, aligned thereto, (in this variation it is also aligned to the rotation axis 5) to its outlet opening located eccentrically to the rotation axis 5. The control openings 156 are formed in a radial distance to the rotation axis 5, which approximately corresponds to the radial distance of the eccentric axial outlet opening of the through opening 152 so that the through opening 152, with its eccentric outlet opening, successively and repeatedly overlaps the control openings 156 in connection with the relative rotation between control disc 154 and sealing disc 152 to thereby carry out the above-described valve function.

Figure 5J:
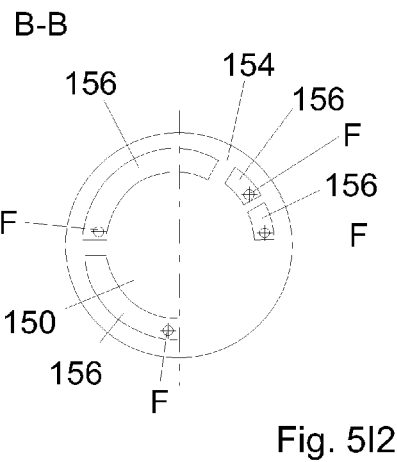
Figure 5J:
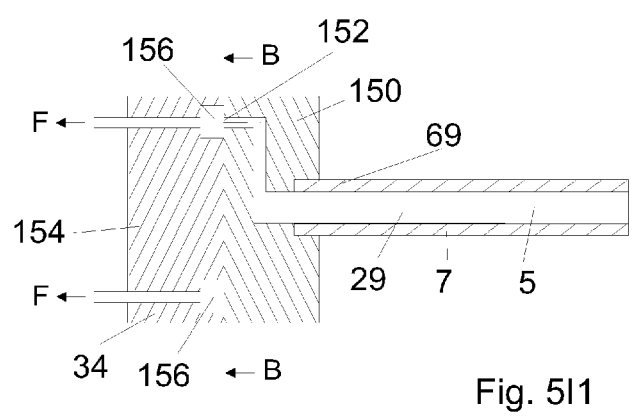
Figure 5J:
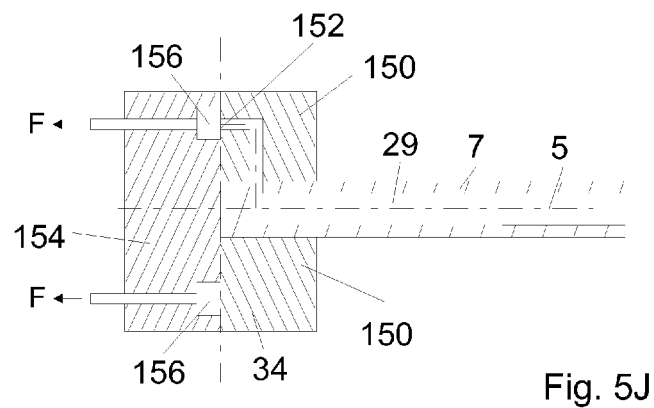

The embodiment illustrated in FIG. 5J, the valve assembly 34 substantially corresponds to the embodiment illustrated in FIGS. 5I1 and 5I2, wherein, however, the sealing disc is not arranged as a cap on the front end side of the bearing shaft 7, but is provided in form of a ring arranged on the other longitudinal end 69 of the bearing shaft 7. The through opening 152 thus extends from the radial inner wall of the sealing disc 159, which is provided as a ring, to its eccentric axial outlet opening. The intermediate connection channel 29 in the bearing shaft 7 has a radially extending end portion which radially leads out at the bearing shaft 7 and which is in permanent fluid connection with the through opening 152 at the radial inner outlet opening thereof.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

We claim:

1. A filter device for filtering out a solid substance from a solid-liquid-mixture, the filter device comprising:
   a bearing shaft extends along a rotation axis;
   a rotation body is attached to the bearing shaft and is supported by the bearing shaft to be rotatable about the rotation axis;
   a single filter cell on the rotation body and the single filter cell includes:
      a filter structure attached to the rotation body for filtering out the solid substance from the solid-liquid-mixture, allowing a liquid of the solid-liquid-mixture to pass therethrough from a filter structure inlet side to a filter structure outlet side, and
      a connection channel is formed in the rotation body and extends from the filter structure outlet side to an outlet opening formed to be adjoining to the bearing shaft and via which the connection channel is permanently connected with an intermediate connection channel, which is formed in an axial center of the bearing shaft, independent from a rotation position of the rotation body;
   a liquid discharge line which is at least one of connected to the intermediate connection channel and is formed by the intermediate connection channel;
   a plurality of branch-off lines branched-off from the liquid discharge line; and
   a control device having a valve assembly, by which the branch-off lines are connectable with the liquid discharge line in a controlled manner based on the rotation position of the rotation body.

2. The filter device according to claim 1, wherein the valve assembly is arranged directly on the liquid discharge line.

3. The filter device according to claim 1, wherein the valve assembly is in the liquid discharge line.

4. The filter device according to claim 1, wherein the valve assembly includes a plurality of valves which are assigned to the branch-off lines and via which the branch-off lines are connectable to the liquid discharge line based on the rotation position of the rotation body.

5. The filter device according to claim 1, wherein the control device includes a pressure control device, by which the pressure difference between the filter structure outlet side and the filter structure inlet side can be controlled from the filter structure outlet side.

6. The filter device according to claim 1, wherein the bearing shaft includes a free end and wherein the rotation body is attached to the free end of the bearing shaft and is supported via a bearing only on one side.

7. The filter device according to claim 1, wherein the control device includes:
   a sensor for detecting the rotation position of the rotation body, and
   an electronic control unit which is connected with the sensor and with the valve assembly, by which the valve assembly can be controlled based on the rotation position of the rotation body detected by the sensor for at least one of connecting and disconnecting a connection between the respective branch-off line and the liquid discharge line.

8. The filter device according to claim 1, further comprising a sealed housing in which the rotation body is accommodated, wherein the housing includes a housing opening located on an axial side facing away from the bearing shaft and closable by a dismountable housing lid and through which the rotation body can be removed from the housing in axial direction of the rotation axis.

9. The filter device according to claim 8, wherein the housing lid includes an inspection window.

10. The filter device according to claim 1, wherein the filter cell includes a filter pocket provided on the side of the filter structure outlet side and formed in the outer circumference of the rotation body and which tapers towards the connection channel.

11. The filter device according to claim 1, wherein the connection channel of the filter cell has a first channel portion extending from the filter structure outlet side perpendicularly to the rotation axis and has a second channel portion extending from the first channel portion to the outlet opening in parallel to the rotation axis.

12. The filter device according to claim 1, wherein the connection channel of the filter cell extends from the filter structure outlet side to its outlet opening in an angle to the rotation axis as well as to the perpendicular thereof.

13. The filter device according to claim 1, wherein the bearing shaft is a rotatably driven rotary shaft with which the rotation body is non-rotatably connected.

14. The filter device according to claim 1, wherein the rotation body is coupled to the end of the bearing shaft by a quick fastener plug-in coupling.

15. The filter device according to claim 1, wherein the rotation body is coupled to the end of the bearing shaft by a quick fastener screw coupling.

16. The filter device according to claim 1, further comprising a sealed housing in which the rotation body is accommodated, wherein the housing includes a housing wall on an axial side facing a bearing of the bearing shaft that extends transversely to the rotation axis and which is arranged between the bearing and the rotation body.

17. The filter device according to claim 1, wherein the solid-liquid-mixture during operation of the filter device sits in a housing external to the rotation body and the filter cell, and a flow of liquid through the filter cell is from external to the rotation body into the connection channel internal to the rotation body.

18. The filter device according to claim 10, wherein the rotation body includes a solid circumferential surface from a first side of the filter pocket to a second side of the filter pocket.

19. A filter device for filtering out a solid substance from a solid-liquid-mixture, the filter device comprising:

a bearing shaft extends along a rotation axis, the bearing shaft having an intermediate connection channel extending along a rotation axis of the bearing shaft from one end to the other end of the bearing shaft;

a rotation body is attached to the bearing shaft and is supported by the bearing shaft to be rotatable about the rotation axis;

a single filter cell on the rotation body and the single filter cell includes:

a filter structure attached to the rotation body for filtering out the solid substance from the solid-liquid-mixture, allowing a liquid of the solid-liquid-mixture to pass therethrough from a filter structure inlet side to a filter structure outlet side, and a connection channel is formed in the rotation body and extends from the filter structure outlet side to an outlet opening formed to be adjoining to the bearing shaft and via which the connection channel is permanently connected with the intermediate connection channel, which is formed in an axial center of the bearing shaft, independent from a rotation position of the rotation body;

a liquid discharge line which is at least one of connected to the intermediate connection channel and is formed by the intermediate connection channel;

a plurality of branch-off lines branched-off from the liquid discharge line; and a control device having a valve assembly, by which the branch-off lines are connectable with the liquid discharge line in a controlled manner based on the rotation position of the rotation body, and wherein the rotation body includes a solid circumferential surface from a first edge of the filter cell to an opposing second edge of the filter cell, and the filter structure inlet side is on an outside of the rotation body.

* * * * *